July 28, 1959
L. P. GARVEY ET AL
2,896,990
VEHICLE CLOSURE LATCH
Filed Jan. 6, 1956
8 Sheets-Sheet 1
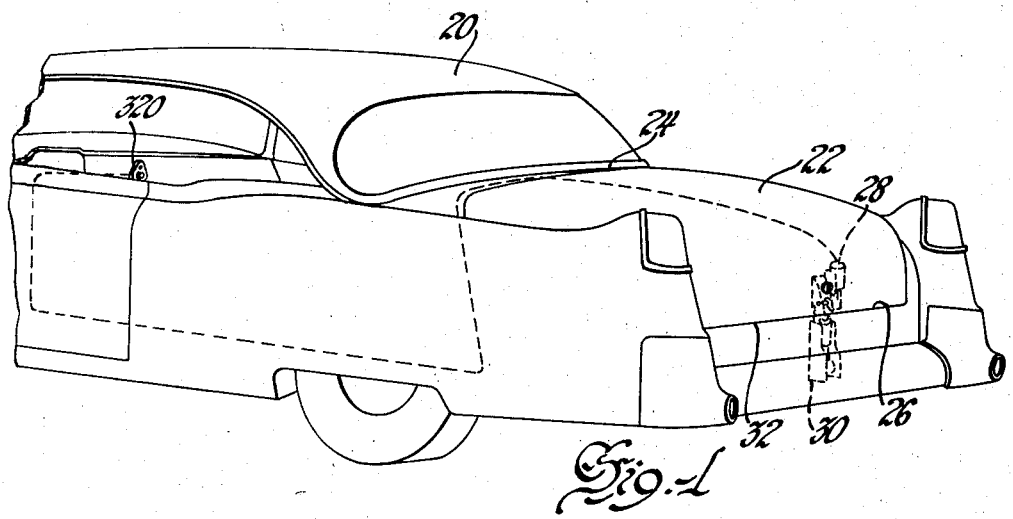
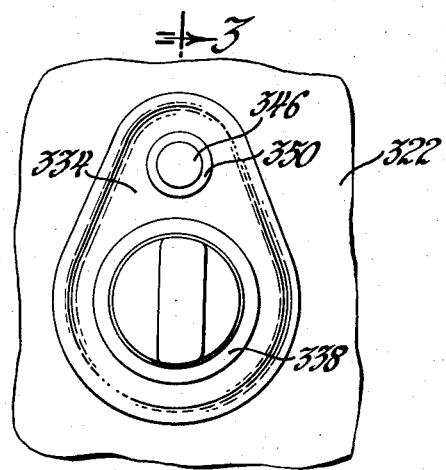
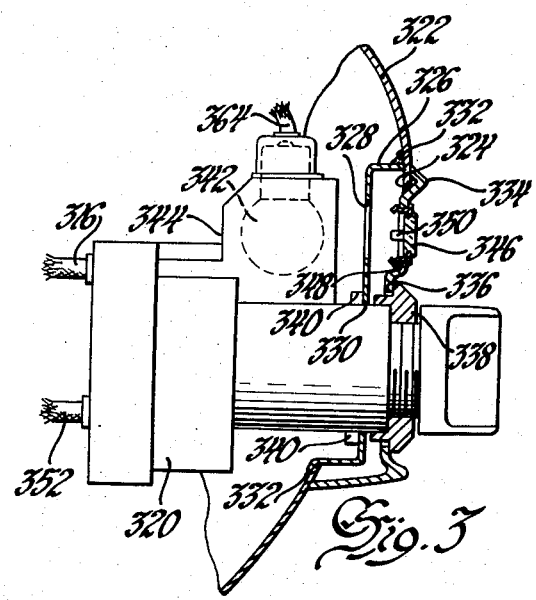
INVENTORS
Louis P. Garvey &
BY Clyde N. Schamel
Paul Fitzpatrick
ATTORNEY

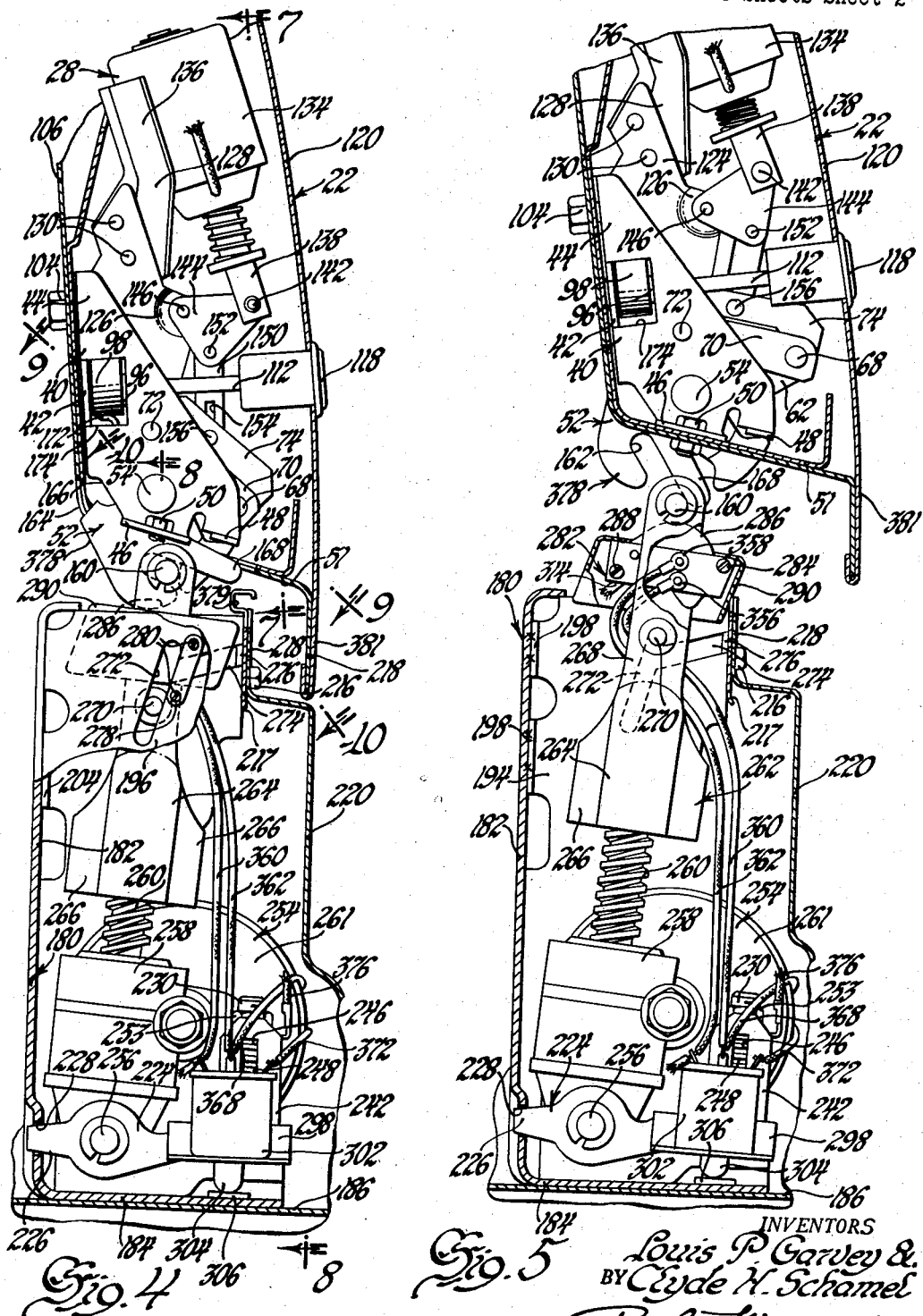

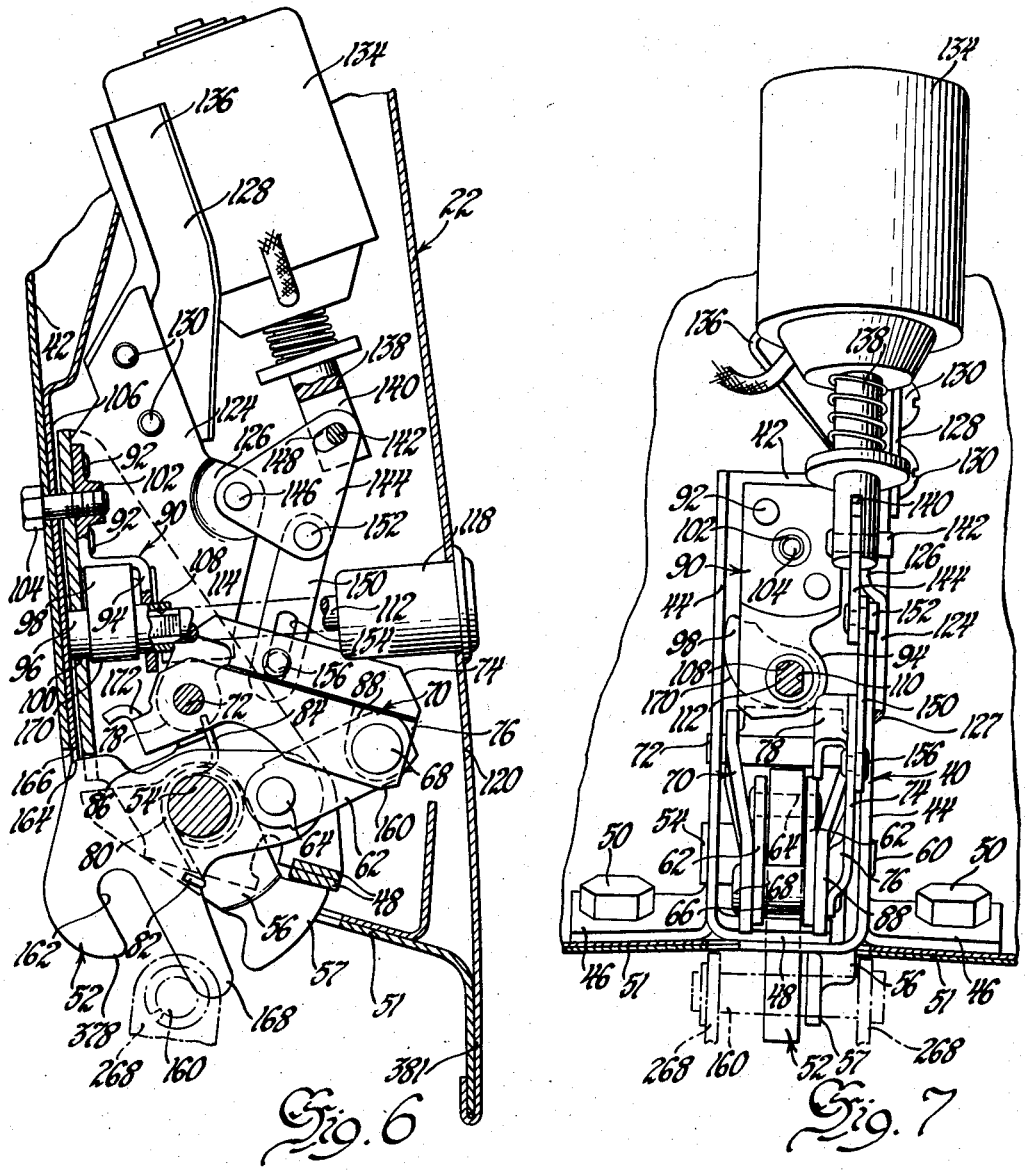

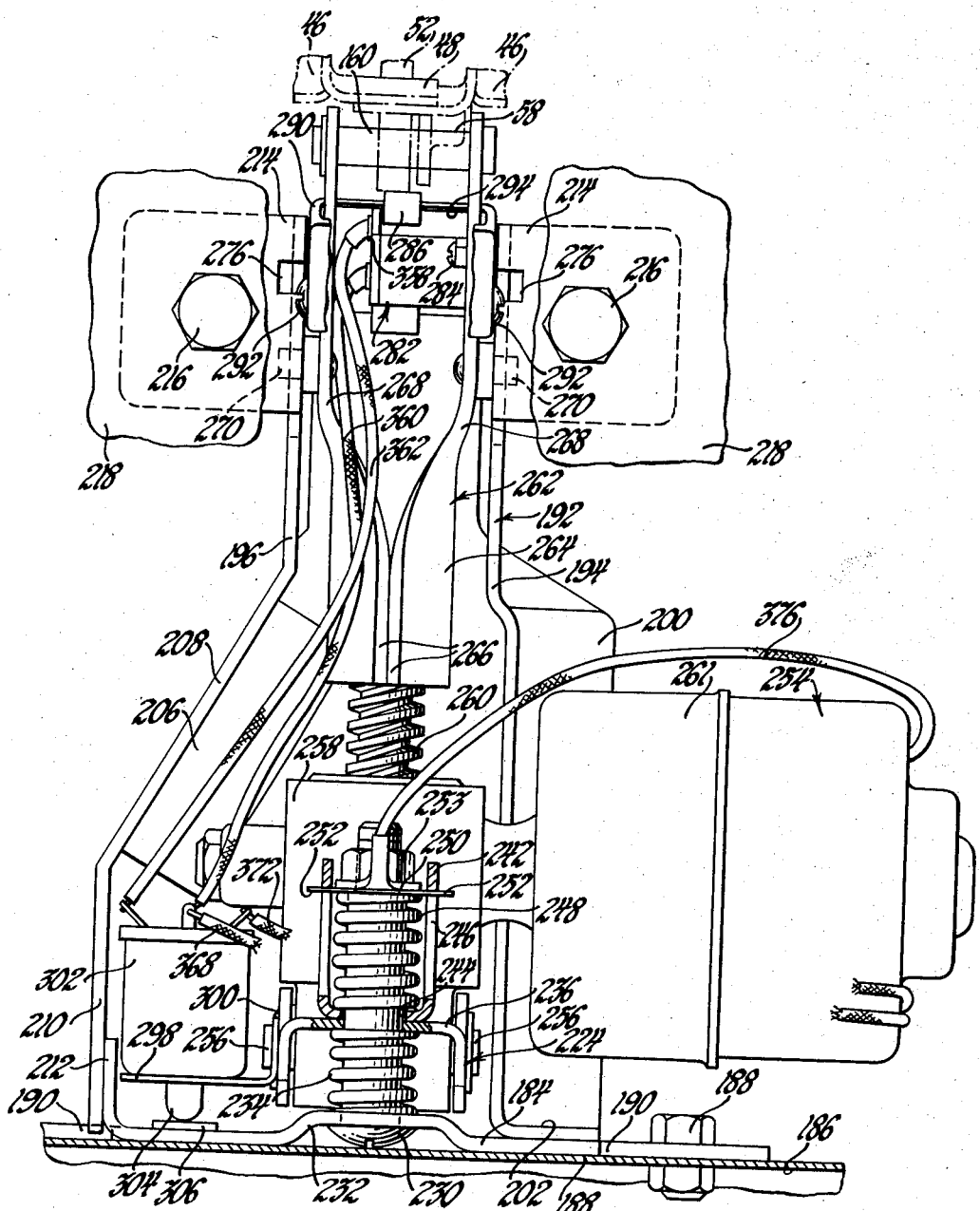

July 28, 1959 L. P. GARVEY ET AL 2,896,990
VEHICLE CLOSURE LATCH
Filed Jan. 6, 1956 8 Sheets-Sheet 5

INVENTORS
Louis P. Garvey &
BY Clyde N. Schamel
Paul Fitzpatrick
ATTORNEY

July 28, 1959

L. P. GARVEY ET AL 2,896,990

VEHICLE CLOSURE LATCH

Filed Jan. 6, 1956

INVENTORS
Louis P. Garvey &
BY Clyde H. Schamel

Paul Fitzpatrick
ATTORNEY

July 28, 1959

L. P. GARVEY ET AL 2,896,990

VEHICLE CLOSURE LATCH

Filed Jan. 6, 1956

INVENTORS
Louis P. Garvey &
BY Clyde H. Schamel

Paul Fitzpatrick
ATTORNEY

July 28, 1959
L. P. GARVEY ET AL
2,896,990
VEHICLE CLOSURE LATCH
Filed Jan. 6, 1956
8 Sheets-Sheet 8
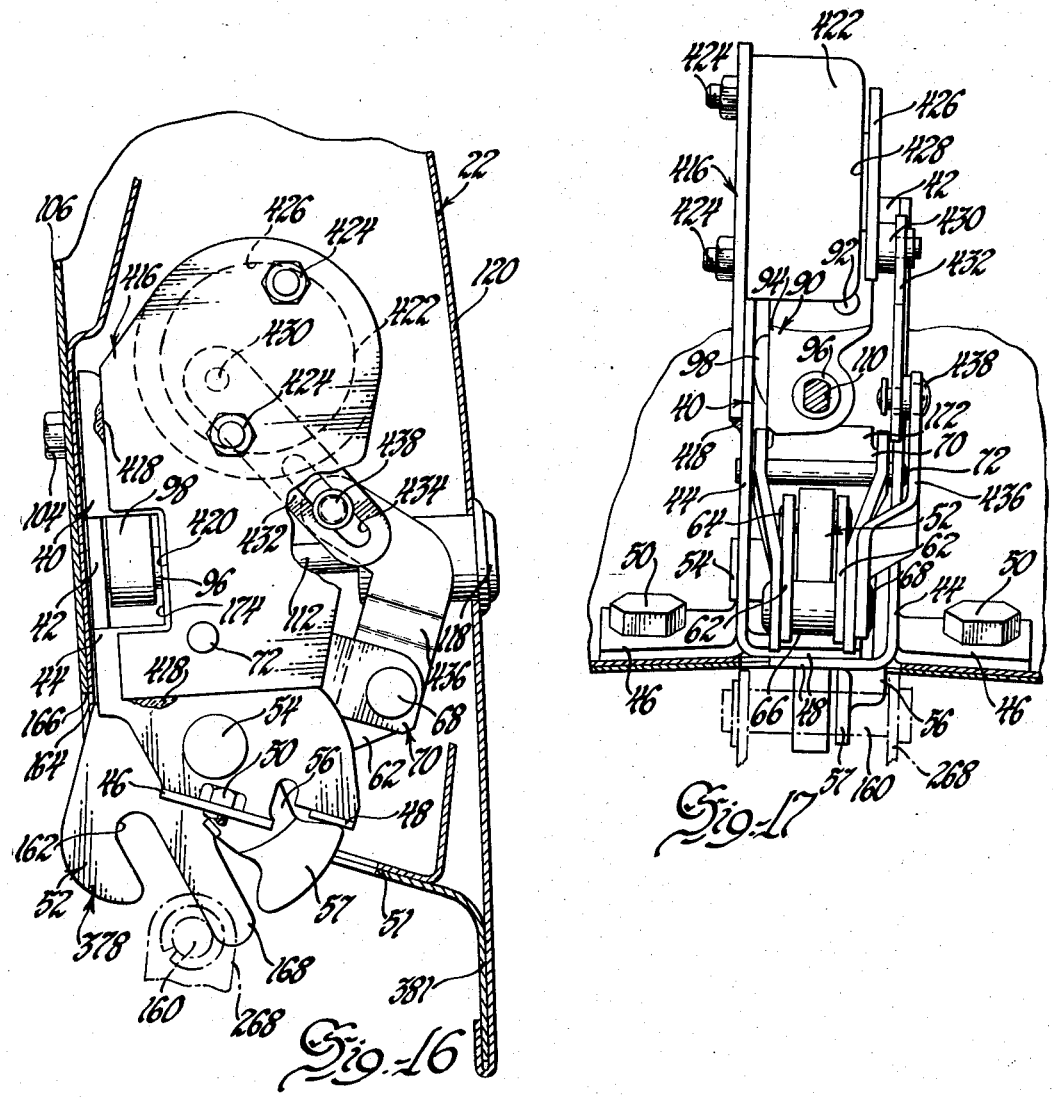
INVENTORS
Louis P. Garvey &
BY Clyde N. Schamel
Paul Fitzpatrick
ATTORNEY

United States Patent Office 2,896,990
Patented July 28, 1959

2,896,990
VEHICLE CLOSURE LATCH

Louis P. Garvey, Detroit, and Clyde H. Schamel, Royal Oak, Mich., assignors to General Motors Corporation, Detroit, Mich., a corporation of Delaware Application January 6, 1956, Serial No. 557,713

13 Claims. (Cl. 292—229)

This invention relates to a vehicle closure latch and more particularly to a power operated vehicle closure or deck lid latch.

In many present vehicles, the driver must leave the passenger compartment of the vehicle and manually unlock the deck lid latch before the deck lid can be opened. Similarly, when it is desired to close the deck lid, the deck lid must be moved to substantially closed position and then manually slammed to trip the deck lid latch and lock the deck lid.

The deck lid latch of this invention, in its preferred embodiment, includes a power operated latch bolt assembly and a power operated retractable and extendable striker assembly. The deck lid latch is power operable from within the vehicle to release the latch bolt assembly from locked engagement with the striker assembly to unlatch the deck lid and automatically extend the striker assembly. The deck lid can then be moved to fully open position by a person outside of the vehicle without requiring the driver to leave the vehicle and without the use of a key. Similarly, when it is desired to close the deck lid, the person outside the vehicle manually moves the deck lid to substantially closed position to trip the latch bolt assembly, and the striker assembly is then automatically retracted to move the deck lid to fully closed position. The latch bolt assembly is also manually operable from outside the vehicle by using a key, selectively and independently of the power operating mechanism for the latch bolt assembly, to unlatch the deck lid, with the striker assembly operating in the same manner.

The primary object of this invention is to provide a new and improved power operated deck lid latch. Another object of this invention is to provide a new and improved power operated deck lid latch which can be operated from within the vehicle to automatically unlatch the deck lid and move the deck lid from a partially closed position to a fully closed position. A more specific object of this invention is to provide a new and improved power operated deck lid latch which includes a power operated latch bolt assembly and a power operated retractable and extendable striker assembly which can be operated from within the vehicle to automatically unlatch the deck lid and move the deck lid from a partially closed position to a fully closed position.

These and other objects of this invention will be readily apparent from the following specification and drawings, in which:

Figure 1 is a partial view of a vehicle embodying a deck lid latch according to this invention;

Figure 2 is a plan view of the operating switch for the deck lid latch;

Figure 3 is a sectional view taken on the plane indicated by line 3—3 of Figure 2;

Figure 4 is a side elevational view of one embodiment of the deck lid latch of this invention in locked position;

Figure 5 is a side elevational view of the deck lid latch of Figure 4 in unlocked position;

Figure 6 is an enlarged side elevational view, partially in section, of the power operated latch bolt assembly of Figure 5;

Figure 7 is an end elevational view of the latch bolt assembly of Figure 4 taken on line 7—7;

Figure 8 is an end elevational view of the striker assembly of Figure 4 taken on line 8—8;

Figure 16 is a side elevational view of the latch bolt assembly of Figure 15 in unlocked position; and Figure 17 is an end elevational view of the latch bolt assembly of Figure 15 taken on line 17—17.

Figure 9:
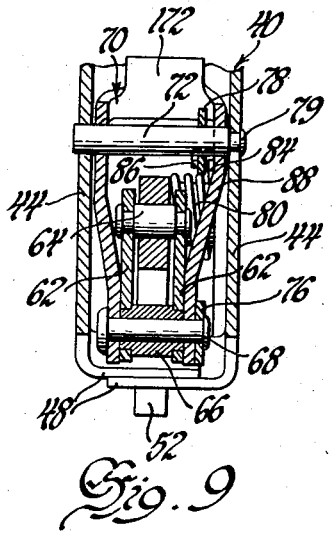
Figure 9 is a sectional view of the latch bolt assembly of Figure 4 taken on the plane indicated by line 9—9.

Referring now to Figure 1, a vehicle 20 includes a rear deck lid 22 which is secured at its forward edge 24 to the vehicle body by suitable counterbalanced hinges, not shown, and is latched at its rearward edge 26 to the body. The deck lid mounts a latch bolt assembly 28 adjacent its rearward edge 26, and a retractable and extendable striker assembly 30 is mounted on the vehicle body adjacent the lower edge 32 of the deck lid opening in the body.

Referring now to Figures 4, 5, 6, 7, 9 and 10, the latch bolt assembly 28 will be described. A channel-shaped mounting bracket 40 includes a base 42 and side walls 44. One end portion of each side wall is bent laterally outwardly to form a mounting flange 46 on either side of bracket 40 and other end portions 48 of each side wall are bent laterally inwardly in juxtaposed relationship and spot-welded together. Bolts 50 extend through mounting flanges 46 to secure bracket 40 to the lower wall 51 of the deck lid 22. A latch bolt 52 is rotatably mounted on a pin 54, Figure 10, of stepped formation which extends between the side walls 44 of bracket 40. A guard 56 having an offset leg 57 is also rotatably mounted on pin 54 and a bushing 58 extends between the guard and latch bolt 52. After assembly, one end 60 of pin 54 is peened over to secure the pin in place on bracket 40 and to fix the position of the guard 56 on pin 54 so that the upper edge of leg 57 will bear against an end portion 48 of a side wall 44 of bracket 40 as can be seen particularly in Figures 6 and 7.

Figure 10:
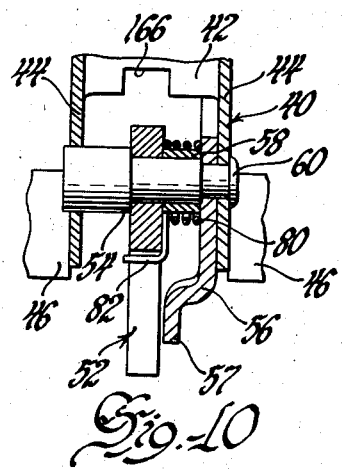
Figure 10 is a sectional view of the latch bolt assembly of Figure 4 taken on the plane indicated by line 10—10.

A pair of links 62 have one end pivotally secured to the latch bolt by stepped pin 64, Figure 9. The other end of each link is rotatably mounted upon bushing 66 rotatably supported by pin 68. A yoke 70 is pivotally mounted at one end thereof on bracket 40 by pin 72 and the legs of the yoke support pin 68. A yoke connecting link 74 has an offset leg 76 pivotally mounted on pin 68 and another offset leg 78 pivotally mounted upon pin 72. After assembly, one end 79 of pin 72 is peened over to fix the pin in place on bracket 40, and the ends of pin 68 are peened over to fix the pin on the legs of yoke 70. A coiled hairpin spring 80 encircles bushing 60 as shown in Figure 10, with one leg 82 thereof engaging the latch bolt and the other leg 84 thereof engaging an offset tab 86 extending laterally inwardly from a leg 88 of yoke 70.

A cam housing 90 is riveted to the base 42 of bracket 40 at 92. The housing includes an apertured offset leg 94 which provides a pivotal support for one end of a shaft 96 which mounts cam 98. The other end of the shaft is pivotally supported in an opening 100 in base 42 of bracket 40 as shown in Figure 6. The cam housing also includes a threaded boss 102 which receives a bolt 104 to secure bracket 40 to the inner wall 106 of the deck lid 22. Shaft 96 is provided with a bore 108 having flat sides 110. An operating rod 112 having an end 114 of cross section similar to bore 108 extends between shaft 96 and a key lock cylinder 118 mounted on the outer wall 120 of deck lid 22.

A mounting plate 124 having an offset apertured ear 126 is welded at 127 to the outer face of one side wall 44 of bracket 40. A solenoid supporting plate 128 is bolted to plate 124 at 130. Plate 128 supports a solenoid 134 which is welded or otherwise secured to an arcuately shaped portion 136 of the plate. The armature 138 of the solenoid is bifurcated at 140 and a pin 142 extends between the legs of the bifurcated portion of the armature. A triangularly shaped bell crank lever 144 is pivotally mounted at 146 upon the offset ear 126 of plate 128 and includes a slot 148 slidably and rotatably mounted on pin 142. A link 150 has one end pivotally secured to bell crank lever 144 at 152 and the other end of the link includes a slot 154 which is slidably and rotatably mounted upon a pin 156 secured to the yoke connecting link 74.

The operation of the latch bolt assembly will now be described with reference to Figures 4, 5, 6 and 7. When the latch bolt assembly is in locked position, as shown in Figures 4 and 7, the striker bar 160 fits within slot 162 of latch bolt 52 and is retained within the slot by the offset foot 57 of guard 56. Links 62 are substantially in alignment with the legs of yoke 70 and the center of pin 64 is slightly above a line through the centers of pins 68 and 72. The over center position of pin 64 with respect to pins 68 and 72 and the action of spring 80 on latch bolt 52 tending to rotate the latch bolt clockwise about pin 54 effectively retains the latch bolt in locked position.

When the latch bolt assembly is moved to unlocked position as shown in Figures 5 and 6 to unlatch the deck lid, yoke 70, yoke connecting link 74, and pin 68 swing counterclockwise about pin 72 to move links 62 counterclockwise about pin 64 which moves slightly clockwise about pin 54. As pins 54, 64, and 68 come into alignment with each other, spring 80 acts to move the latch bolt 52 about pin 54 to unlocked position as pin 64 moves clockwise about pin 54 to an over center position to one side of a line through pins 54 and 68. The over center position of pin 64 with respect to pins 54 and 68 and the action of spring 80 tending to rotate the latch bolt 52 clockwise about pin 54 effectively retains the latch bolt in unlocked position. In the unlocked position of the latch bolt, a shoulder 164 of the latch bolt 52 engages the base of a notched opening 166, Figure 10, in the base 42 of bracket 40 and the inner wall 106 of deck lid 22 to limit the movement of the latch bolt. When the latch bolt assembly is in unlocked position as shown in Figures 5 and 6, the deck lid is moved to a partially open position by the counterbalanced hinges supporting the deck lid at its forward edge, not shown, and may be manually moved between this position and a fully open position.

When the latch bolt moves from unlocked position, as shown in Figures 5 and 6, to locked position, as shown in Figures 4 and 7, by manually slamming the deck lid the engagement of finger 168 of the latch bolt with the striker bar 160 swings the latch bolt 52 counterclockwise about pin 54 to move pin 64 from its over center position with respect to pins 54 and 68 to its over center position with respect to pins 68 and 72 as links 62 move into alignment with the legs of yoke 70 and latch bolt 52 moves to locked position. When pin 64 has moved from its position slightly below a line through the centers of pins 54 and 68 to a position slightly above this line and slightly below a line through the centers of pins 68 and 72, spring 80 aids in moving the latch bolt into final locked position.

The latch bolt assembly may be unlocked by means of solenoid 134 or by means of a suitable key which fits within key cylinder 118 to partially open deck lid 22. In either instance, the latch bolt assembly is locked by manually slamming deck lid 22 so that finger 168 of the latch bolt engages striker bar 160 as previously described. When solenoid 134 unlocks the latch bolt assembly, energization of the solenoid retracts the solenoid armature 138 which shifts bell crank lever 144 counterclockwise about pivot 146 to shift link 150 upwardly and in turn swing yoke 70, link 74, and pin 68 counterclockwise about pin 72 to move latch bolt 52 to unlocked position as previously described. The latch bolt is returned to locked position by manually slamming the deck lid 22 since the solenoid 134 will only unlock the latch bolt but will not return the latch bolt to locked position.

If it is desired to unlock the latch bolt assembly by means of the key lock cylinder 118, a key is fitted within the cylinder to rotate rod 112. Rotation of rod 112 turns shaft 96 and cam 98 in a counterclockwise direction as viewed in Figure 7, so that an edge 170 of the cam will contact an arcuately shaped tab 172 on yoke 70 to shift the yoke, link 74, and pin 68 counterclockwise about pin 72 to move the latch bolt 52 to unlocked position as previously described and unlatch the deck lid. A side wall 44 of bracket 40 is apertured at 174 to allow for swinging movement of cam 98. When it is desired to move the latch bolt to locked position, the deck lid 22 is manually slammed so that finger 168 will contact the striker bar 160 and move the latch bolt to locked position as previously described.

Unlocking of the latch bolt assembly by energization of solenoid 134 may be accomplished independently of unlocking of the latch bolt assembly by the key cylinder 118. Similarly, unlocking of the latch bolt assembly by the key lock cylinder 118 may be accomplished independently of solenoid 134. Thus, each manner of unlocking the latch bolt assembly may be selectively and independently operated. This is important to the driver of the vehicle for it allows him to unlock the latch bolt assembly from within the vehicle without having to leave the vehicle or to unlock the latch bolt assembly from outside the vehicle without having to enter the vehicle. It will be noted that the interconnection between the key lock cylinder 118 and the latch bolt 52 is through cam 98 which must be rotated counterclockwise, as viewed in Figure 7, before the latch bolt 52 can be unlocked. The key lock cylinder 118 includes spring means for urging rod 112 in a clockwise direction, as viewed in Figure 7, to bias cam 98 to inoperative position. Therefore, solenoid 134 can be energized to unlock the latch bolt assembly without any actuation or interference from cam 98 of the key lock cylinder assembly.

The interconnection between solenoid 134 and yoke connecting link 74 is through bell crank 144 and link 150. The pivotal connection between yoke connecting link 74 and link 150 is by means of a pin 156 secured to the link and slot 154 of link 150. This pin and slot connection provides a lost motion connection between solenoid 134 and yoke connecting link 74 to allow the yoke connecting link and yoke 70 to swing about pivot 72 without any movement of bell crank 144 or the solenoid armature 138. Thus, rotation of cam 98 through rod 112 and key lock cylinder 118 to swing the yoke connecting link and yoke 70 about pin 72 can be accomplished without any interference from the bell crank 144 and the solenoid armature 138. When the yoke connecting link 74 is moved about pivot 72 by means of key lock cylinder assembly, link 150 will swing about its pivot 152 on bell crank 144 as slot 154 moves slidably and rotatably about pin 156. Thus, it can be seen that the latch bolt assembly may be unlocked to partially open the deck lid by means of the key lock cylinder assembly 118 independently and selectively of energization of solenoid 134.

Referring now to Figures 4, 5 and 8, the retractable and extendable striker assembly will be described. A mounting bracket 180 having an upwardly extending portion 182 and a laterally extending portion 184 is secured to a body structural member 186 by bolts 188 extending through mounting flanges 190 on either side of the laterally extending portion 184 of the bracket. A support bracket 192, which includes separate side walls 194 and 196, is supported by mounting bracket 180. Side wall 194 of the bracket includes a spaced pair of laterally inwardly extending flanges 198, Figures 4 and 5, spot welded to portion 182 of bracket 180; a laterally outwardly extending flange 200 also spot welded to portion 182 of bracket 180; and a laterally outwardly extending flange 202 spot welded to portion 184 of bracket 180. Side wall 196 of bracket 192 includes a spaced pair of laterally inwardly extending flanges 204 similar to flanges 198 and spot welded to portion 182 of bracket 180; a flange 206 extending laterally inwardly from an oblique portion 208 of side 196 and spot welded to portion 182 of bracket 180; and a lower portion 210 spot welded to an upwardly extending flange 212 of portion 184 of bracket 180. Side walls 194 and 196 also include laterally outwardly extending apertured flanges 214 which are bolted at 216 to reinforcing member 217 and a flange 218 of body structural member 220. Body structural member 220 is an outer body fillet panel extending between the lower edge 32 of the deck lid opening and the lower edge of the vehicle body.

A yoke 224 is supported at one end by having the legs 226 of the yoke fit within apertures 228 in the laterally extending portion 182 of bracket 180. A bolt 230 extends upwardly through an apertured embossed portion 232 of portion 184 of bracket 180 and a coil spring 234 encircling the bolt fits between the apertured web 236 of yoke 224 and embossed portion 232 to support the other end of the yoke. A U-shaped bracket 242 having an apertured base 244 also fits on bolt 230. The legs of the bracket are slotted at 246 and a spring 248 extends between the base of the bracket and a spring limit stop 250 which extends between the legs of the bracket and has flanges 252 fitting within the slots 246 in the legs of the bracket. The limit stop 250 is apertured to receive a threaded end portion of the bolt of reduced diameter and a nut 253 threaded on the end portion of the bolt clamps stop 250 against the shoulder of the bolt. Springs 234 and 248 act to maintain yoke 224 and bracket 242 in their position shown in Figure 8. Since both the yoke and the bracket can move upwardly along bolt 230, the expansive force of spring 248 is made greater than that of spring 234. This will maintain the bracket and yoke in their position shown, with flanges 252 of the fixed stop 250 in engagement with the upper ends of slots 246 of the bracket. Bracket 242 cannot shift downwardly from its position shown in Figure 8 due to the engagement of the fixed stop within the bracket. Thus, it can be seen that one end of yoke 224 is swingably mounted in bracket 180 by means of slots 228 and the other end of the yoke is resiliently supported by spring 234 on bolt 230 for downward shifting movement but is substantially fixed against upward shifting movement.

A screw jack assembly 254 is pivotally supported on yoke 224 at 256. A lead screw 260 extends upwardly from the gear reduction assembly housing 258 and is driven by the motor 261 through the gear reduction assembly. A nut 262 is threadedly mounted on lead screw 260. The nut is formed by a pair of sheet metal members having arcuate portions 264 which house a threaded sleeve and include tabs 266 which are spot welded together to assemble the nut. The flat upwardly extending legs 268 of the nut mount outwardly extending guide pins 270 which extend through oblique slots 272 formed in side walls 194 and 196 of bracket 192. Oblique slots 274 in side walls 194 and 196 extend laterally from the upper portions of slots 272 and terminate at 276 in flanges 214 of the side walls. Slots 274 allow assembly of the screw jack assembly, including yoke 224 as a unit within bracket 192. The legs 226 of yoke 224 are initially fitted within slots 228 and the guide pins 270 are then fitted within terminal portions 276 of slots 274. The screw jack assembly is then tilted inwardly about pins 256 until the guide pins enter slots 272. Retainers 278 are bolted to side walls 194 and 196 at 280 to prevent accidental removal of the guide pins from slots 272. The striker bar 160 extends between the terminal portions of the flat upwardly extending legs 268 of the nut.

A micro-switch 282 is secured to legs 264 of the nut at 284 and includes a contact 286 pivoted on the micro-switch at 288 and biased upwardly, as shown in Figure 5, by a suitable spring. The micro-switch is protected by a housing 290 bolted to legs 268 at 292. The housing includes an aperture 294 to allow assembly of the housing on the legs of the nut and allow swinging movement of contact 286 about pivot 288. An angle bracket 298 is welded at 300 to one side of yoke 224. This bracket supports a double type pressure actuated switch 302, with the plunger contact 304 of the switch always biased into engagement with a tab 306 which is lanced out of the laterally extending portion 184 of bracket 180.

The operation of the retractable and extendable striker assembly will now be described with reference particularly to Figure 8. Motor 261 drives the lead screw 260 through the reduction gear assembly in housing 258. Nut 262 is held against rotation by means of guide pins 270 in slots 272 and rotation of lead screw 260 will therefore cause the nut to move along the lead screw to either extend or retract the striker bar 160. Since slots 272 are oblique, downward movement of the nut on the lead screw to retract the striker bar 160 will cause the screw jack assembly 254 to be shifted counterclockwise about pivots 256 as viewed in Figure 4, and upward movement of the nut along the lead screw to extend the striker bar 160 will cause the screw jack assembly to be shifted clockwise about pivots 256. Since the weight of the screw jack assembly is supported by yoke 224 and spring 234, shifting of the screw jack assembly clockwise about pivots 256 will compress spring 234, and shifting of the screw jack assembly counterclockwise about pivots 256 will allow extension of spring 234 until web 236 of yoke 224 engages the base of bracket 242. As spring 234 is compressed, the plunger contact 304 of the double-type pressure actuated switch 302 will be moved inwardly within the micro-switch to engage one set of contacts of the switch, and as spring 234 is extended, contact 304 will move outwardly from within the micro-switch to its position shown in Figure 8, to engage the other set of contacts of the switch.

Figure 11:
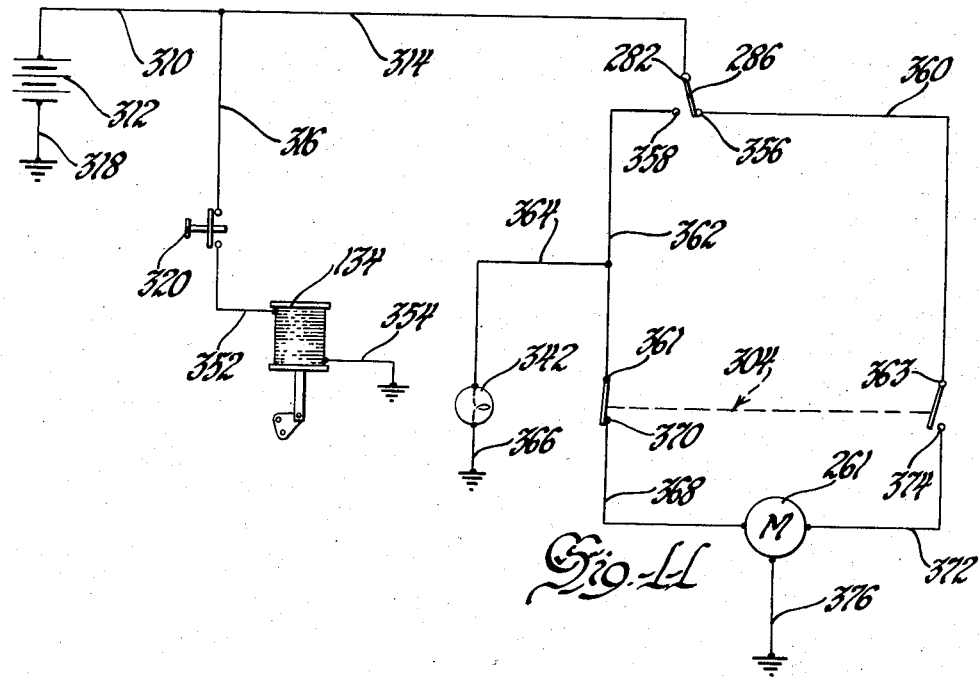
Figure 11 is a circuit diagram for the deck lid latch of this invention.

Referring now to Figures 1, 4, 5 and 11, the operation of the deck lid latch will be described. Figure 11 is a circuit diagram for the deck lid latch. A conductor 310 extends from battery 312 to conductors 314 and 316. Battery 312 is grounded through conductor 318. Conductor 316 extends to a manually actuated switch 320 which is mounted on the dash of the vehicle, as shown in Figure 1. Figures 2 and 3 show the details of the switch. The dash 322 of the vehicle is suitably apertured at 324 and a mounting bracket 326 having openings 328 and 330 is secured to the inner surface of the dash as by welding at 332. Switch 320 extends outwardly through the opening 330 in mounting bracket 326. An escutcheon plate 334 covers the aperture 324 in the dash and is apertured at 336 to receive switch 320. A nut 338 threaded on the switch body holds the escutcheon plate and switch in place with shoulders 340 of the switch in engagement with mounting bracket 326. A bulb 342 is supported on switch 320 by means of a bracket 344 and light rays from this bulb pass outwardly through aperture 328 in plate 326 and through a suitably colored lens 346 mounted in an aperture 348 in the escutcheon plate by means of a flexible ring 350.

Conductor 352 extends from switch 320 to solenoid 134 which is grounded through conductor 354. Conductor 314 extends to micro-switch 282. The contact 286 of the switch is movable between contacts 356 and 358 as the contact swings about pivot 288. A conductor 360 extends from contact 356 to contact 363 the double type pressure actuated switch 302 and a conductor 362 extends from contact 358 to contact 361 the same switch. A conductor 364 extends from conductor 362 to lamp 342 which is grounded through conductor 366. A conductor 368 extends from contact 370 of switch 302 to motor 261 and a conductor 372 extends from the other contact 374 of switch 302 to motor 261. The motor is grounded through conductor 376. The plunger contact 304 closes contacts 361 and 370 when the deck lid latch assembly is in locked position with the striker retracted, and closes contacts 363 and 374 when the deck lid latch assembly is in unlocked position with the striker assembly extended. The sets of contacts are alternately and selectively closed or opened but cannot be simultaneously closed or opened.

As has been previously described, the latch bolt 52 may be moved to unlocked position to unlatch deck lid 22 either by solenoid 134 or by the key lock cylinder assembly 118. In the locked position of the latch bolt, contact 286 of switch 282 engages contact 356 and plunger contact 304 of switch 302 closes contacts 361 and 370 and opens contacts 363 and 374 so that the circuit to the motor is interrupted. Assuming now that the latch bolt 52 is unlocked, as the latch bolt swings about pin 54 so as to be released from engagement with the striker bar 160 the lower edge 378 of the latch bolt moves along the upper edge of contact 286 of switch 282 and allows the switch contact 286 to be spring biased upwardly as previously described. This movement of contact 286 connects conductor 314 with contact 358. A circuit is then completed through conductor 362 and contact 370 of switch 302 to the up winding of motor 261 to start the motor and rotate the screw jack in a direction to move the nut 262 upwardly along the screw jack and move the striker bar 160 to its extended position as shown in Figures 5 and 6, as the latch bolt moves to unlocked position. As the nut moves upwardly along the lead screw, the screw jack assembly shifts clockwise about pins 256 to compress spring 234 and move yoke 224 downwardly to move plunger contact 304 of switch 302 inwardly within the switch. When the nut has reached its upper limit position, plunger contact 304 has moved the required distance inwardly of the switch to open contacts 361 and 370 and close contacts 363 and 374. This breaks the circuit to the motor through conductor 368 and stops the motor. Whenever the circuit is completed to the motor through conductor 362, bulb 342 on the dash is lighted to indicate to the driver that the deck lid has been opened. Since conductor 364 is connected to conductor 362 to one side of switch contact 361, stopping of motor 261 by opening of contacts 361 and 370 will not turn the bulb off.

Assuming now that the deck lid is manually slammed and the latch bolt 52 is moved to locked position by engagement with the striker bar 160, as has been previously described, switch contact 286 of the micro-switch 282 will be biased clockwise about pivot 288. This will shift contact 286 into engagement with contact 356 and connect conductor 314 with conductor 360. Since contacts 363 and 374 of switch 302 are closed, conductor 360 will be connected with the down winding of motor 261 through conductor 372 to start the motor and rotate the lead screw in a direction to retract nut 262 and striker bar 160. As nut 262 is retracted, the deck lid is pulled to closed position. As has been previously described, when the nut 262 moves downwardly along the lead screw, the screw jack assembly is shifted counterclockwise about pivots 256 to allow plunger contact 304 to move outwardly from within switch 302. When the nut has reached its limit position and contact 304 has moved the required distance outwardly from within the switch, contacts 363 and 374 are opened and contacts 361 and 370 closed to break the circuit to the down-winding of the motor and stop the motor. The deck lid latch is then readied for another cycle of operation.

From the above description, it can be seen that the screw jack assembly will be actuated regardless of whether the latch bolt is moved to unlocked position by the key lock cylinder assembly 18 or by solenoid 134. Referring now specifically to Figure 11, it will be noted that when the switch 320 is closed to connect conductor 316 with conductor 352 and energize solenoid 134 to unlock the latch bolt, the circuit will operate in the same manner as previously described.

Referring now particularly to Figures 4 and 5, the upper end of the reinforcing member 217 is provided with an open channel-shaped continuous groove 379. A weather strip (not shown) fits within this groove and extends rearwardly into engagement with the inner surface of the lower flange 381 of the deck lid 22 to provide a seal for the deck lid latch and also for the luggage compartment within the vehicle. By providing the retractable striker assembly which pulls the deck lid to fully closed position, a tight seal is always obtained since the extent of retraction of the striker assembly can be adjusted to insure that the weather strip will be sufficiently compressed to prevent air and moisture leaks into the luggage compartment and to the deck lid latch.

Figures 12, 13:
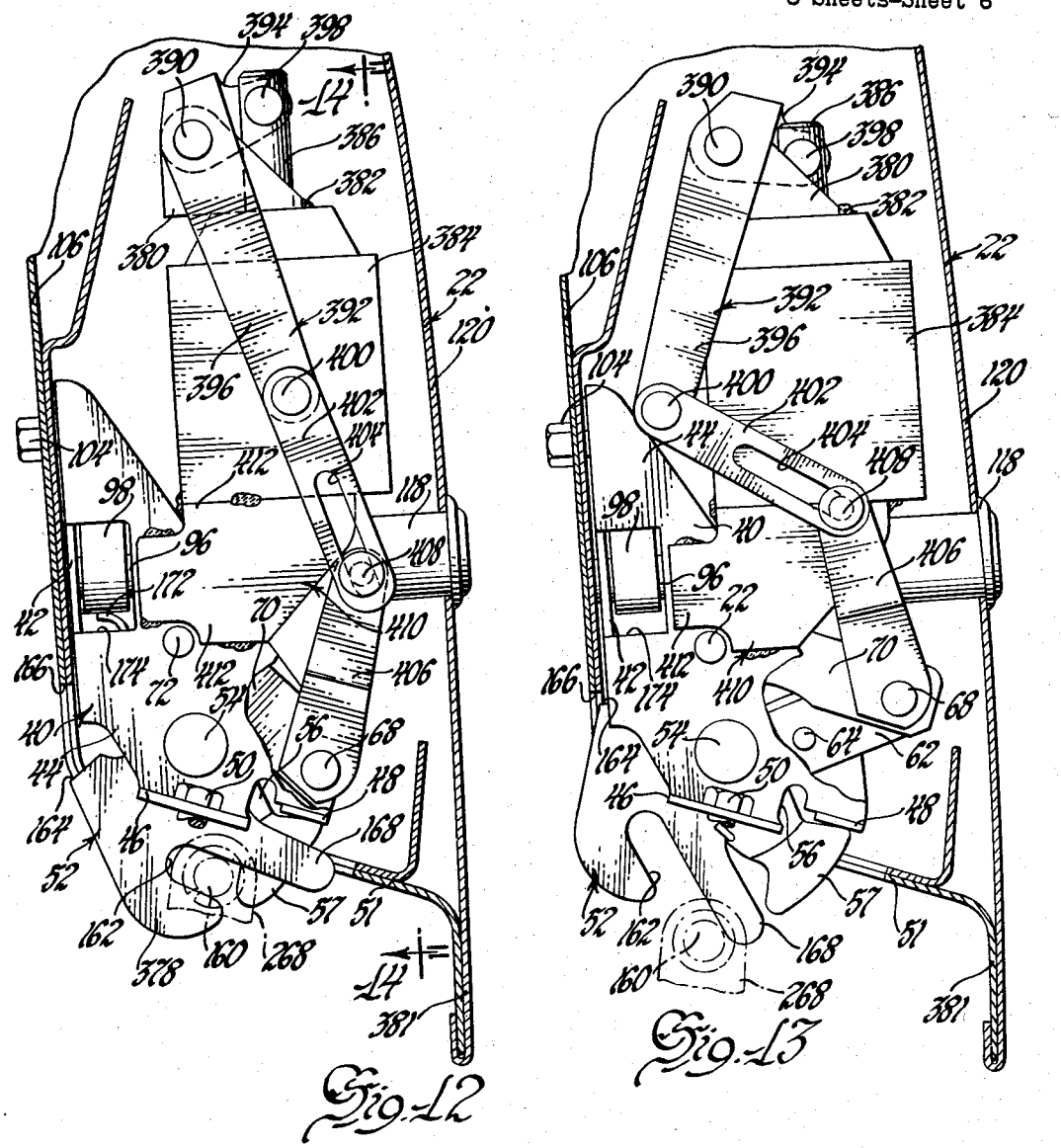
Figure 12 is a side elevational view of a second embodiment of a latch bolt assembly in locked position.
Figure 13 is a side elevational view of the latch bolt assembly of Figure 12 in unlocked position.
Figure 14:
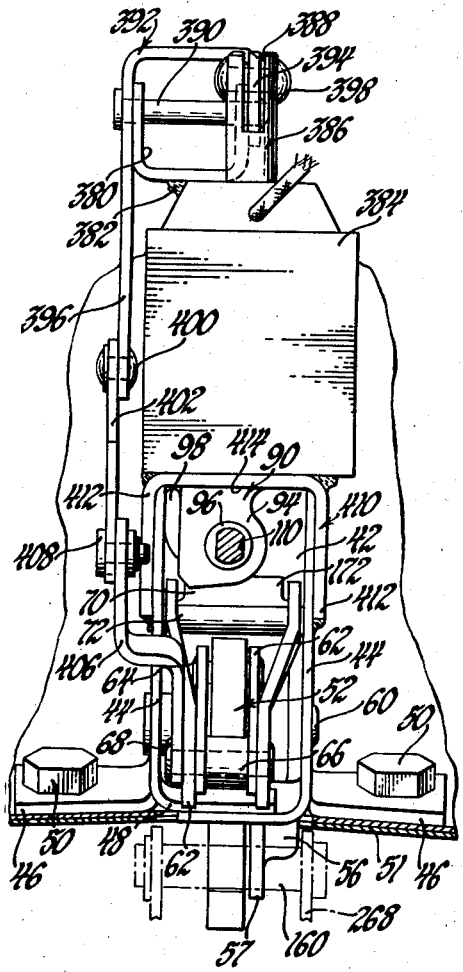
Figure 14 is an end elevational view of the latch bolt assembly of Figure 12 taken on line 14—14.

Referring now to Figures 12 through 14, a modified latch bolt assembly will be described. This latch bolt assembly is similar to that previously described in Figures 4 and 5 and like numerals will be used for like parts. A U-shaped bracket 380 is welded at 382 to the upper surface of a solenoid 384. The solenoid armature 386 extends upwardly from the solenoid and is slotted at 388, Figure 14. A pin 390 spans the legs of bracket 380 to provide a pivotal support for a U-shaped bell crank lever 392. One arm 394 of the lever is substantially shorter than the other arm 396 of the lever and extends laterally with respect thereto. Arm 394 fits within slot 388 of the solenoid armature and is pivotally connected thereto at 398. The other arm 396 of the bell crank lever is pivotally connected at 400 to a link 402 which includes a slot 404. An offset lever 406 is pivotally mounted on pin 68 and mounts a stud 408 which is slidably and rotatably received in slot 404 of link 402. The solenoid 384 is mounted on bracket 40 by means of a U-shaped bracket 410 having the legs 412 thereof welded to the outer surface of the side walls 44 of bracket 40 and the base 414 thereof welded to the lower surface of the solenoid.

The operation of this latch bolt assembly is substantially the same as that previously described in conjunction with the latch bolt assembly shown in Figures 4 and 5. Link 402 having slot 404 provides a lost motion connection between the bell crank 392 and the actuating linkage for the latch bolt to allow the latch bolt to be moved to unlocked position by either the solenoid 384 or the key lock cylinder 118.

This modified latch bolt assembly is shown in locked position in Figure 12 and in unlocked position in Figure 13. Upon reference to these figures it will be noted that when solenoid 384 is actuated to unlock the latch bolt 52, the solenoid armature 386 is retracted to shift the bell crank lever 392 clockwise about pivot 390, as viewed in Figure 13. As arm 396 of the bell crank lever swings clockwise about the pivot, link 402 is shifted forwardly of the vehicle to swing arm 406 upwardly and move pivot 68 upwardly to unlock the latch bolt as previously described. When the latch bolt is unlocked by means of the key lock cylinder assembly 118, pivot 68 and link 406 also shift upwardly. However, the slot 404 and the stud 408 provide a lost motion connection between the latch bolt assembly and the solenoid actuated linkage to allow for this movement without any movement of the bell crank lever 392.

Figure 15:
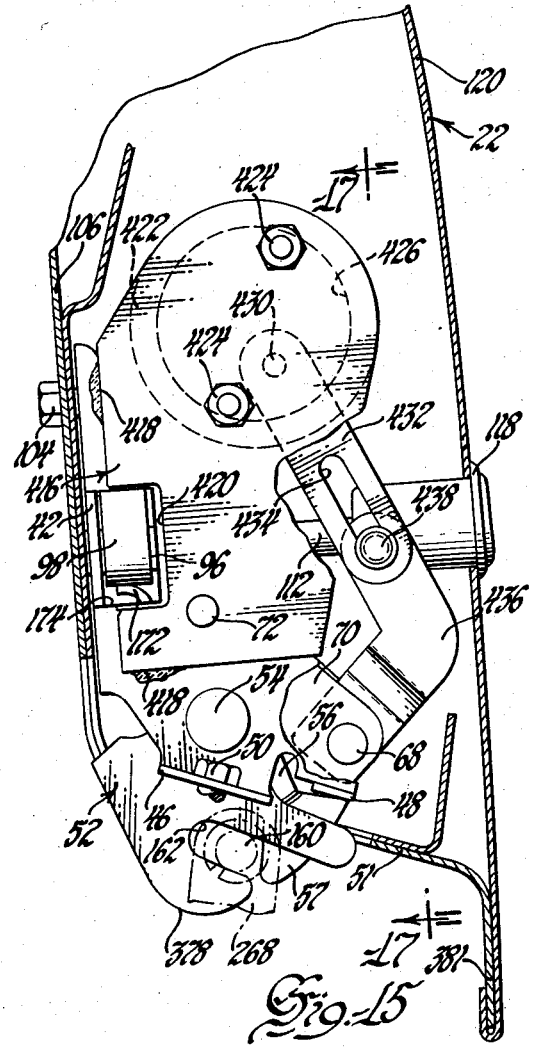
Figure 15 is a side elevational view of a third embodiment of a latch bolt assembly in locked position.

Referring now to Figures 15 through 17, a second modified latch bolt assembly will be described. A plate 416 is welded to the outer surface of one of the side walls 44 of bracket 40 at 418 and includes a cut out portion 420 so as not to close the opening 174 for cam 96. A rotary solenoid 422 is secured to plate 416 by bolts 424. A circular plate 426 is secured to the armature 428 of the solenoid and supports a stud 430. A link 432 is pivotally mounted on stud 430 and includes a slot 434. An offset angular link 436 is pivotally mounted on pin 68 and mounts a stud 438 which slidably and rotatably receives slot 434 of link 432.

The operation of this second modified latch bolt assembly is substantially the same as that shown and described in conjunction with Figures 4 and 5. The slot 434 of link 432 provides a lost motion connection between the rotary solenoid and the actuating linkage for the latch bolt 52 to allow operation of the latch bolt by either the solenoid 422 or the key lock cylinder 118. Figure 15 shows the second modified latch bolt assembly in locked position and Figure 16 shows the latch bolt assembly in unlocked position. When it is desired to unlock the latch bolt by means of solenoid 422, the solenoid is actuated to rotate the solenoid armature 428 and plate 426 in a clockwise direction, as viewed in Figure 16. This shifts link 432 forwardly and upwardly with respect to the vehicle body to shift link 436 and pin 68 upwardly to move the latch bolt assembly to unlocked position as previously described. When the latch bolt assembly is unlocked by means of the key lock cylinder 118, pin 68 and link 436 are again shifted upwardly. The lost motion connection provided by slot 434 of link 432 and stud 438 allows this movement of the pin and link 436 without movement of the solenoid armature or plate 426.

Thus, this invention provides a power operated deck lid latch which is operable from within the vehicle to release the latch bolt assembly from locked engagement with the striker assembly to unlatch the deck lid and automatically extend the striker assembly. The deck lid latch is also operable to move the deck lid to fully closed position after a person outside the vehicle has slammed the deck lid so as to cause the latch bolt assembly to engage the striker. Although the latch of this invention has been shown and described in conjunction with a vehicle deck lid, it is obvious that it will have many other varied and useful operations in conjunction with other vehicle closures or otherwise.

While a specific embodiment of this invention has been shown and described, various changes and modifications may be made within the scope and spirit of the invention.

We claim:

1. In a latch mechanism, the combination comprising, latch means movable to locked and unlocked positions, striker means bodily movable to a number of positions and being engageable by said latch means in locked position in at least one of said positions, means for bodily moving said striker means to said number of positions, and control means actuated by movement of said latch means from locked to unlocked positions when said striker means is in said one of said positions for actuating said means to bodily move said striker means from said one of said positions to another of said positions.

2. In a latch mechanism, the combination comprising, latch means movable to locked and unlocked positions, striker means bodily movable to a number of positions and being engageable by said latch means in locked position in at least two of said number of positions, means for bodily moving said striker means between said two positions, and control means actuated by movement of said latch means from unlocked to locked positions when said striker means is in one of said two positions for actuating said means to bodily move said striker means in engagement with said latch means to the other of said two positions.

3. In a latch mechanism, the combination comprising, latch means movable to locked and unlocked positions, striker means bodily movable to a number of positions and being engageable by said latch means in locked position in at least two of said number of positions, means for bodily moving said striker means between said two positions, and control means actuated by movement of said latch means from locked to unlocked positions when said striker means is in one of said two positions for actuating said means to bodily move said striker means to the other of said two positions, said control means being actuated by movement of said latch means from unlocked to locked positions when said striker means is in said other of said two positions for actuating said means to bodily move said striker means in engagement with said latch means to said one of said two positions.

4. In combination with a support member having an opening therein and a closure member swingably mounted on the support member for opening and closing movement, latch means mounted on said closure member and being movable to locked and unlocked positions, striker means mounted on said support member adjacent said opening and being bodily movable to extended and retracted positions with respect to said opening, said striker means being contactable by said latch means in unlocked position when said striker means is in said extended position and said closure is in partially closed position to move said latch means to locked position in engagement with said striker means, means for bodily moving said striker means between said extended and retracted positions, and control means actuated by movement of said latch means to locked position when said striker means is in said extended position for actuating said means to bodily move said striker means to retracted position to thereby move said closure to fully closed position.

5. In combination with a support member having an opening therein and a closure member swingably mounted on the support member for opening and closing movement, latch means mounted on said closure member and being movable to locked and unlocked positions, striker means mounted on said support member adjacent said opening and being bodily movable to extended and retracted positions with respect to said opening, said latch means being in engagement with said striker means when said striker means is in said retracted position to hold said closure in fully closed position, means for bodily moving said striker means between said extended and retracted positions, and control means actuated by movement of said latch means to unlocked position when said striker means is in said retracted position for actuating said means to bodily move said striker means to extended position to move said closure to an open position.

6. In combination with a support member having an opening therein and a closure member swingably mounted on the support member for opening and closing movement, latch means mounted on said closure member and being movable to locked and unlocked positions, manually operable means for moving said latch means to unlocked position, striker means mounted on said support member adjacent said opening and being bodily movable to extended and retracted positions with respect to said opening, said latch means being in engagement with said striker means when said striker means is in said retracted position to hold said closure in fully closed position, means for bodily moving said striker means between said extended and retracted positions, and control means actuated by movement of said latch means to unlocked position by said manually operable means when said striker means is in said retracted position for actuating said means to bodily move said striker means to extended position to move said closure to an open position.

7. In combination with a support member having an opening therein and a closure member swingably mounted on a support member for opening and closing movement, latch means mounted on said closure member and being movable to locked and unlocked positions, power operated means for moving said latch bolt to unlocked position, striker means mounted on said support member adjacent said opening and being bodily movable to extended and retracted positions with respect to said opening, said latch means being in engagement with said striker means when said striker means is in said retracted position to hold said closure in fully closed position, second power operated means for moving said striker means between said extended and retracted positions, and control means actuated by movement of said latch means to unlocked position by said power operated means when said striker means is in said retracted position for actuating said second power operated means to bodily move said striker means to extended position.

8. In combination with a support member having an opening therein and a closure member swingably mounted on a support member for opening and closing movement, latch means mounted on said closure member and being movable to locked and unlocked positions, manually operable means for moving said latch bolt to unlocked position, power operated means for moving said latch bolt to unlocked position, means interconnecting said latch bolt with said manually operable means and said power operated means permitting operation of either of said means selectively and independently of the other of said means, striker means mounted on said support member adjacent said opening and being bodily movable to extended and retracted positions with respect to said opening, said latch means being in engagement with said striker means when said striker means is in said retracted position to hold said closure in fully closed position, means for bodily moving said striker means between said extended and retracted positions, and control means actuated by movement of said latch means to unlocked position by either said manually operable means or said power operated means when said striker means is in said retracted position for actuating said means to bodily move said striker means to extended position to move said closure member to an open position.

9. In a latch mechanism including latch means movable to locked and unlocked positions, a housing, retractable and extendable means mounted on said housing for movement to extended and retracted positions relative thereto, striker means secured to said means for movement therewith, said striker means being contactable by said latch means in unlocked position when said striker means is in said extended position to move said latch means to locked position in engagement with said striker means, means for moving said extendable and retractable means between said positions thereof, and control means on said housing actuated by movement of said latch means to locked position in engagement with said striker means for actuating said means to move said retractable and extendable means and said striker means to retracted position.

10. In a latch mechanism including latch means movable to locked and unlocked positions, a housing, retractable and extendable means swingably mounted on said housing for swinging movement relative thereto upon movement of said means to extended and retracted positions, striker means mounted on said retractable and extendable means for movement therewith, said striker means being contactable by said latch means in unlocked position when said striker means is in extended position to move said latch means to locked position in engagement with said striker means, means for moving said retractable and extendable means between said positions thereof, and control means actuated by movement of said latch means to locked position in engagement with said striker means for actuating said means to move said extendable and retractable means and said striker means to retracted position, and pressure actuated means controlled by swinging movement of said retractable and extendable means relative to said housing to limit the retracting movement of said means.

11. In a latch mechanism including latch means movable to locked and unlocked positions, a housing, lever means swingably mounted on said housing at one end thereof and being supported at the other end thereof by pressure responsive means, retractable and extendable means pivotally mounted on said lever means for relative swinging movement thereto upon movement of said retractable and extendable means to extended and retracted positions, striker means mounted on said extendable and retractable means for movement therewith, said striker means being contactable by said latch means in unlocked position when said striker means is in said extended position to move said latch means to locked position in engagement with said striker means, means for moving said extendable and retractable means between said positions thereof, and control means actuated by movement of said latch means to locked position in engagement with said striker means for actuating said means to move said retractable and extendable means to retracted position, and means controlled by said pressure responsive means upon pivotal movement of said retractable and extendable means relative to said lever means to limit the retraction movement of said means for moving said extendable and retractable means.

12. In an automobile having a body member with a closure member hingedly mounted thereon, a latch mounted on one of said members and including a bolt movable between latched and unlatched positions, a striker mounted on the other member for bodily movement between extended and retracted positions when in latching engagement with said bolt to move said closure member between an open position away from said body member and a closed position in sealing engagement therewith, means for moving said striker between said extended and retracted positions, and control means actuated by latching engagement of said bolt with said striker when said striker is in one position thereof to actuate said means to move said striker to said other position thereof and thereby move said closure member between said open and closed positions thereof.

13. In an automobile having a body member and a closure member hingedly mounted thereon, a latch closure member hingedly mounted on one of said members and including a bolt movable between latched and unlatched positions, a striker mounted on the other member for bodily movement from an extended to a retracted position when in latching engagement with said bolt to move said closure member from an open position to a closed position in sealing engagement with said body member, operating means for bodily moving said striker from said extended to said retracted position, and control means actuated by latching engagement of said bolt with said striker when said striker is in said extended position to actuate said operating means to bodily move said striker to said retracted position and thereby move said closure member from said open position thereof to said closed position thereof.

References Cited in the file of this patent

UNITED STATES PATENTS

| | | |
|---|---|---|
| 1,250,574 | Ferris | Dec. 18, 1917 |
| 2,704,218 | Claud-Mantle | Mar. 15, 1955 |
| 2,741,503 | Thompson | Apr. 10, 1956 |
| 2,753,202 | Smith | July 3, 1956 |